3,798,107
LAMINATING APPARATUS
William Townsend Bright, 1029 Webster Road,
Summersville, W. Va. 26651
Filed Aug. 23, 1971, Ser. No. 174,029
Int. Cl. B29b 5/00
U.S. Cl. 156—500   4 Claims

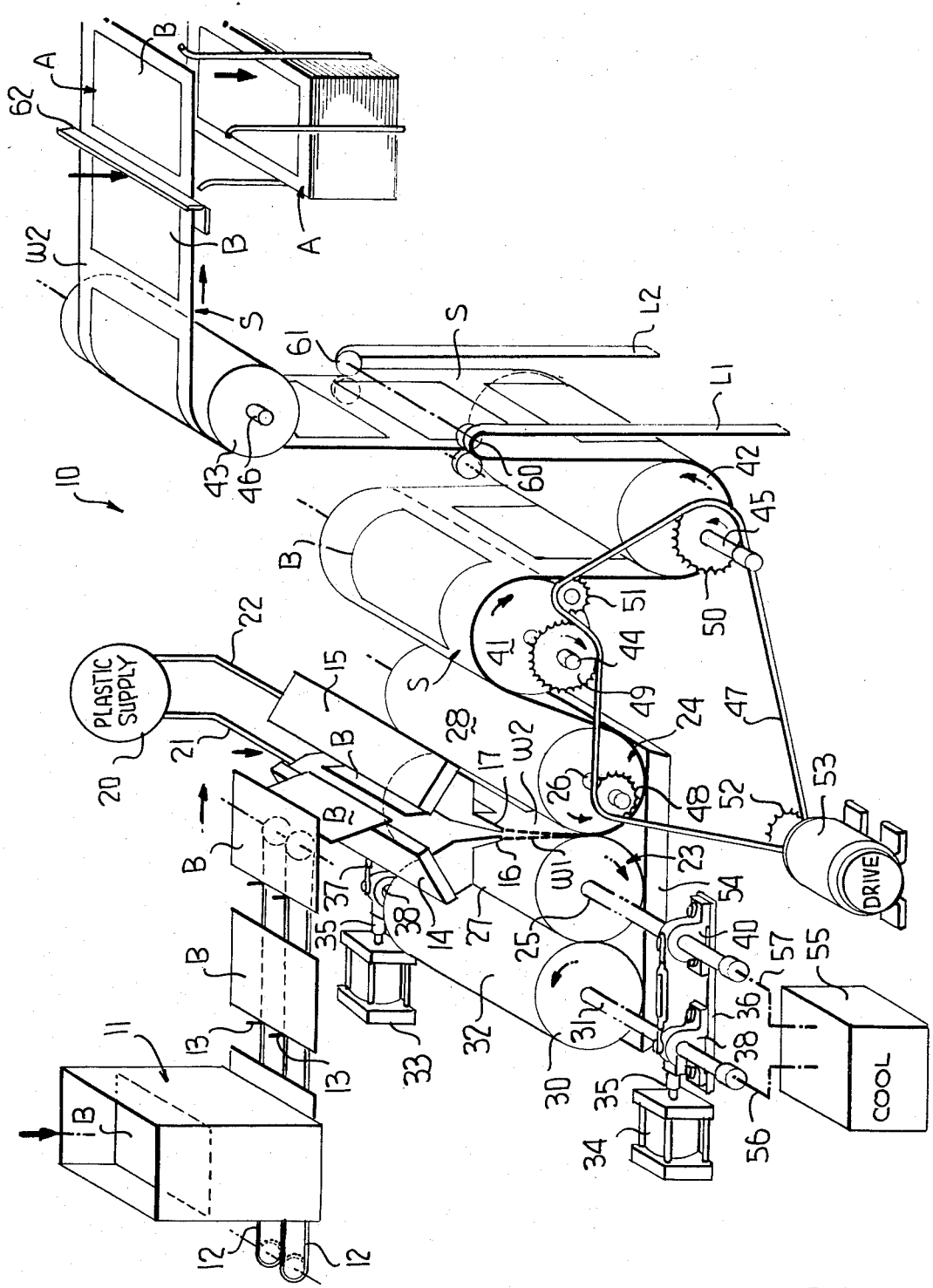

ABSTRACT OF THE DISCLOSURE

This disclosure relates to a laminating apparatus including means for extruding a pair of hot plastic webs between which is sandwiched sheets of paper stock material thus forming a sandwich web structure which when transversely severed forms table place mats or the like, the apparatus further including resilient and rigid surfaced rolls between which the sandwich web structure is fed, and means for moistening an exterior surface of the resilient roll. The apparatus further includes means for maintaining the resilient and rigid rolls at respective temperature ranges of 70° F.–90° F. and 90° F.–110° F.

The present invention is directed to a laminating apparatus including means for extruding a pair of hot plastic webs, means for feeding sheet material between the webs and forming therewith a sandwich web structure, means for applying pressure against the webs from opposite directions to compress the sandwich web structure, the pressure applying means being a pair of rolls defining a nip through which moves the sandwich web structure, and means for moistening an exterior surface of at least one of the rolls whereby the hot plastic web does not stick thereagainst and delamination of the eventually cooled sandwich web structure is virtually precluded.

A further object of this invention is to provide a novel laminating apparatus of the type heretofore described wherein the pair of rolls include respective rigid and resilient surfaces with the resilient surface being the surface moistened by the moistening means, and means for drivingly rotating the rigid roll only.

Still another object of this invention is to provide a novel laminating apparatus of the type heretofore described wherein the resilient roll has a hardness ranging between 60–100 Shore A durometer, and the pressure at the nip ranges between 100–140 lbs. per lineal inch.

With the above and other objects in view that will hereinafter appear, the nature of the invention will be more clearly understood by reference to the following detailed description, the appended claimed subject matter, and the several views illustrated in the accompanying drawing.

In the drawing:

The single figure of drawing is a highly schematic perspective view of the laminating apparatus of this invention, and illustrates means for feeding individual sheets between a pair of extruder manifolds to form a sandwich web structure which is fed between the nip of rigid and resilient surfaced rolls and eventually longitudinally and transversely trimmed into individual table mats, place mats or the like.

The laminating apparatus or machine of this invention is generally designated by the reference numeral 10 and includes a conventional hopper 11 in which is stacked a plurality of blanks B which are bottom-fed out of the hopper 11 by conventional chain feeders 12 having pusher lugs 13 which move each blank B from left-to-right, as indicated by the unnumbered headed arrow associated therewith. Each individual blank B is then gravity-fed through suitable guide means (not shown) to and through a pair of manifolds 14, 15 having respective nozzles 16, 17 from which issues a pair of webs W1, W2 of hot plastic material such as, for example, polyethylene or the like. The plastic material is fed to the manifolds 14, 15 from a conventional extruder 20 through respective conduits 21, 22. The plastic material or "melt" ranges between 360° F. and 420° F. as it leaves the nozzles 16, 17, but a preferable operable working temperature has been found to be approximately 390° F. This temperature is maintained while rotating the screw (not shown) of the extruder 20 at approximately 70 r.p.m. thus developing a pressure in the manifolds 14, 15 of approximately 625–675 p.s.i.

The webs W1, W2 and the blanks B sandwiched therebetween are fed into a nip (unnumbered) of a pair of pressure and chilling rolls 23, 24 which are suitably keyed to respective shafts 25, 26 journalled for rotation in the machine frame (not shown). The roll 23 has a resilient surface 27 formed by a one-inch thick rubber (Hypolon) covering having a durometer hardness of 80 Shore A although 65–95 Shore A durometer hardness has been found satisfactory for lower running speeds of the apparatus 10. A surface 28 of the roll 24 is rigid polished steel with the pressure applied to the webs W1, W2 and the blanks B in the nip between the rolls 23, 24 being approximately 120 lbs. per lineal inch, although here again the range may be varied for higher and/or lower running speeds.

In order to obtain the nip pressure heretofore noted an idler back-up roll 30 fixed to a shaft 31 journalled in the frame of the apparatus 10 has a rigid surface 32 which contacts the surface 27 and urges the roll 23 to the right by virtue of a pair of hydraulic fluid motors 33, 34 having piston rods 35 keyed to sliding brackets 36 which shift the rolls 23, 30 to the right to increase nip pressure and the left to decrease nip pressure. Moreover, the pressure at the nip between the rolls 23, 30 may be adjusted by simply turning a toggle bolt 37 to move a pair of brackets 38, 40 toward or away from each other to thereby respectively increase or decrease the pressure at the nip defined by the surfaces 27, 32. Thus, the nip pressure can be varied between the surfaces 27, 32 by the toggle bolts 37 and between the surfaces 27, 28 by the fluid cylinders 33, 34. Preferably, though not necessarily, the nip pressure between the surfaces 27, 28 of the rolls 23, 24, respectively, is approximately that heretofore noted, namely, 120 lbs. per lineal inch.

The webs W1, and W2 and the blanks B after passing through the nip of the rolls 23, 24 constitute a sandwich web structure generally designated by the reference character S which is entrained about a rigid metallic roll 41, another rigid metallic roll 42 and another roll 43 having respective shafts 44, 45 and 46 journalled for rotation in the frame of the apparatus 10. The roll 43 is simply an idler roll while the rolls 24, 41 and 42 are appropriately driven by a drive chain 47 entrained about sprockets 48, 49 and 50 keyed to the respective shafts 26, 44 and 45. The chain 47 is also entrained about a conventional tension sprocket 51 and a sprocket 52 keyed to a shaft (not shown) of a drive motor 53 which imparts rotation to the rolls in the direction indicated by the unnumbered headed arrows associated therewith.

In order to prevent the webs W1, W2 and the sandwich structure S from adhering to the surfaces 27, 28 of the rolls 23, 24, respectively, and the surfaces of the remaining downstream rolls 41, 42 and 43, the rolls 23, 30 are supported with the surfaces 27, 32, respectively, thereof immersed in water in a pan 54 maintained at a temperature ranging between 40–60° F., but preferably approximately 50° F. It has been unobviously discovered that by both cooling the surface 27 of the resilient surface roll 23 and maintaining the same moist delamination, sticking, etc., has been precluded by the operation of the apparatus 10. The cooling of the rolls 23, 30 is achieved by circulating a suitable coolant from a reservoir 55 through appropriate conduits 56, 57 and universal couplings (not shown) to the shafts 31, 25, respectively, which are hollow and whose opposite ends (not shown) define return lines coupled to the reservoir 55. In actual practice the surface temperature of the roll 30 is maintained between 20–40° F., but preferably at about 30° F. Likewise, the surface temperature of the resilient roll 23 is maintained between 70–90° F., while an optimum temperature has been found to be approximately 80° F. The surface temperature of the rolls 24, 41 and 42 is less critical with optimum temperatures being found to be approximately 100° F., 75° F. and 75° F., respectively, with ranges being respectively 90–110° F., 65–85° F., and 65–85° F.

During the passage of the web structure S between the rolls 42, 43 longitudinal edges L1, L2 thereof are severed by conventional slitters 60, 61, and thereafter a transverse cutter 62 severs the sandwich web structure S into a plurality of individual table mats, place mats, or like laminated articles A which are subsequently stacked in a hopper 63.

While preferred forms and arrangements of parts have been shown in illustrating the invention, it is to be clearly understood that various changes in details and arrangement of parts may be made without departing from the spirit and scope of this disclosure.

I claim:

1. Laminating apparatus comprising means for extruding a pair of hot plastic webs, means for feeding sheet material between the webs and forming therewith a sandwich web structure, means for applying pressure against the webs from opposite directions to compress the sandwich web structure, said pressure applying means being a pair of rolls defining a nip through which moves the sandwich web structure, means for moistening an exterior surface of at least one of the rolls with a coolant, said pair of rolls including respective rigid and resilient surfaces, said exterior surface and said resilient surface being one and the same, a third roll in back-up contact with said at least one roll, means for cooling said third roll and said resilient surface having a hardness ranging between 60–100 Shore A.

2. The laminating apparatus as defined in claim 1 wherein at least one of said rolls is an idler roll, and means are provided for drivingly rotating the other of said rolls.

3. The laminating apparatus as defined in claim 1 including means for circulating coolant through said pair of rolls.

4. The laminating apparatus as defined in claim 1 including means for circulating coolant through said pair of rolls and maintaining said rigid surface roll cooler than said resilient surface roll.

References Cited
UNITED STATES PATENTS

| | | | |
|---|---|---|---|
| 3,230,127 | 1/1966 | Cleereman et al. | 156—500 X |
| 3,215,578 | 11/1965 | Craver | 156—500 X |
| 3,234,066 | 2/1966 | Mulholland | 156—244 |
| 3,131,113 | 4/1964 | Arbit et al. | 156—244 X |
| 3,058,863 | 10/1962 | Gaines et al. | 156—244 |
| 3,516,886 | 6/1970 | Quackenbush et al. | 156—244 |
| 3,222,237 | 12/1965 | McKeluy | 156—244 X |
| 3,398,035 | 8/1968 | Cleereman et al. | 156—244 |

ALFRED L. LEAVITT, Primary Examiner

C. WESTON, Assistant Examiner

U.S. Cl. X.R.

156—244